United States Patent [19]

Sapru et al.

[11] Patent Number: 4,551,400
[45] Date of Patent: Nov. 5, 1985

[54] HYDROGEN STORAGE MATERIALS AND METHODS OF SIZING AND PREPARING THE SAME FOR ELECTROCHEMICAL APPLICATIONS

[75] Inventors: Krishna Sapru; Kuochih Hong, both of Troy; Michael A. Fetcenko, Farmington Hills; Srinivasan Venkatesan, Royal Oak, all of Mich.

[73] Assignee: Energy Conversion Devices, Inc., Troy, Mich.

[21] Appl. No.: 601,641

[22] Filed: Apr. 17, 1984

[51] Int. Cl.⁴ .......................... H01M 4/36; H01M 6/24
[52] U.S. Cl. ...................................... 429/94; 420/900; 423/644; 429/101; 429/209
[58] Field of Search ...................... 420/900, 424, 580; 423/644; 429/101, 209, 94

[56] References Cited

U.S. PATENT DOCUMENTS

| | | | |
|---|---|---|---|
| 4,112,199 | 9/1978 | Dunlop et al. | 429/101 |
| 4,160,014 | 7/1979 | Gamo et al. | 423/644 |
| 4,440,736 | 4/1984 | Maeland et al. | 420/900 |

FOREIGN PATENT DOCUMENTS 0091950 7/1980 Japan .................................. 420/900

OTHER PUBLICATIONS

Gutjahr et al., A New Type of Reversible Negative Electrode for Alkaline Storage Batteries Based on Metal Alloy Hydrides, 8th Int. Power Sources Conf., p. 79, 1974.

Primary Examiner—Donald L. Walton
Attorney, Agent, or Firm—Timothy H. Gens; Lawrence G. Norris; Richard M. Goldman

[57] ABSTRACT

The present invention provides novel active materials which reversibly store hydrogen under conditions which make them exceptionally well-suited for elecrochemical applications. These active materials have both novel compositions and structures. A first group of active material compositions incorporate the elements of titanium, vanadium, and nickel. A second group adds zirconium to the first group of active materials. A preferred third composition group adds chromium to the first group of active materials. These materials may be single or multiphase combinations of amorphous, microcrystalline, or polycrystalline structures. Preferably, these materials have a multiphase polycrystalline structure. Methods of reducing the size or of sizing these materials, as well as other hydride-forming alloys, also are provided. Methods of preparing the inventive hydrogen storage materials and fabricating electrodes from these active materials are contemplated. Electrochemical cells and batteries assembled with the inventive electrodes provide significantly improved capacity and cycle life.

59 Claims, 10 Drawing Figures

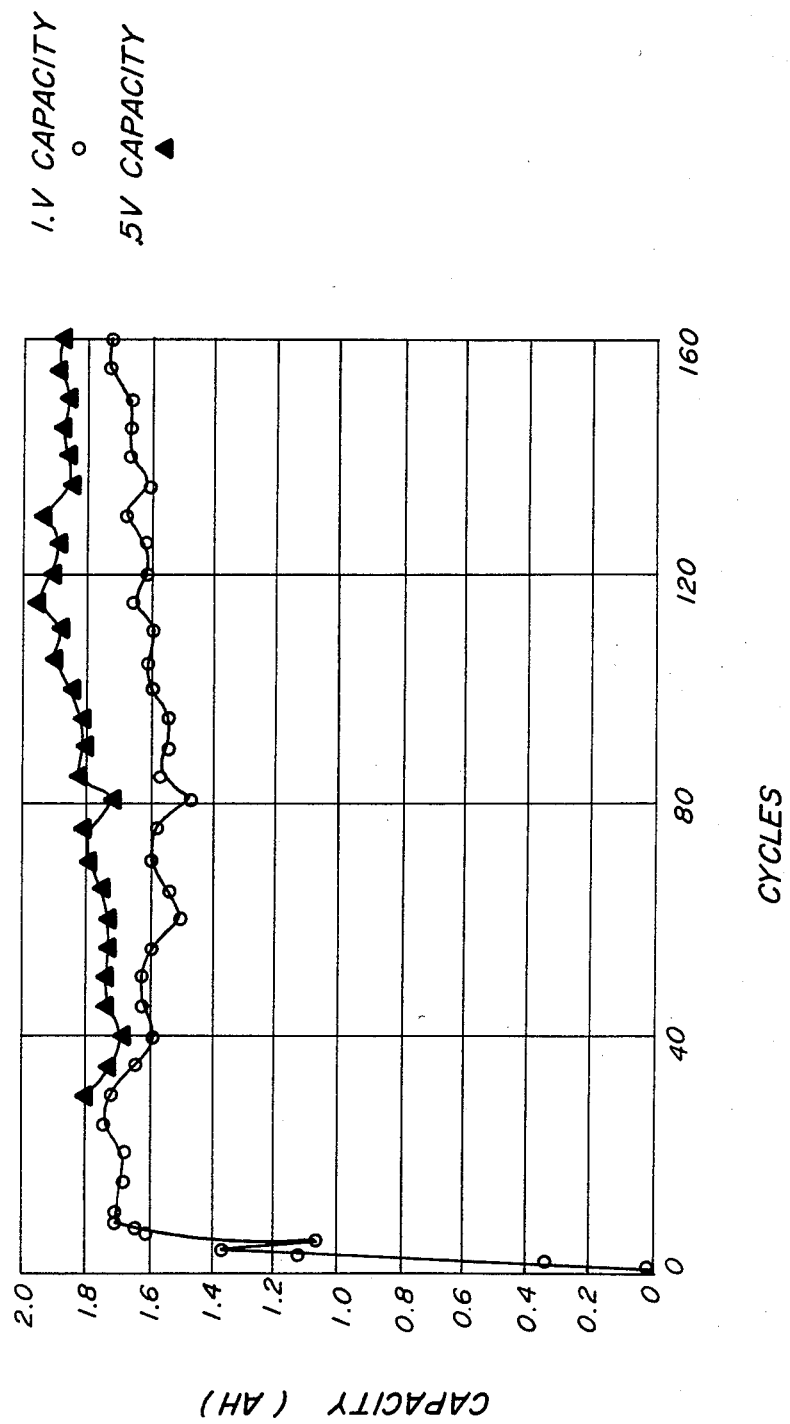

HYDROGEN STORAGE MATERIALS AND METHODS OF SIZING AND PREPARING THE SAME FOR ELECTROCHEMICAL APPLICATIONS

BACKGROUND OF THE INVENTION

The subject matter of this invention relates to the field of energy storage and utilization with novel compositions of matter that reversibly store hydrogen as a source of electrochemical energy for subsequent release to produce an electrical current. More particularly, novel active material compositions, processes of making the active material, fabrication and assembly of electrodes, cells, and batteries are disclosed herein.

Some research has been conducted involving hydrogen storage secondary batteries. However, a basic understanding resulting in a viable approach to optimizing such batteries hs not been forthcoming in the scientific or patent literature. Examples of such efforts are U.S. Pat. Nos. 3,669,745 and 3,824,131 and a technical paper entitled "A New Type of Reversible Negative Electrode for Alkaline Storage Batteries Based on Metal Alloy Hydrides," 1974, 8th International Power Sources Conference. These research efforts have not resulted in widespread commercial utilization of this battery technology. In fact, the prior research suggests no significant improvement over conventional battery systems such as nickel cadmium. As a result, the hydrogen storage battery system has apparently been ignored or abandoned.

Secondary batteries using a hydrogen rechargeable electrode operate in a different manner than lead acid, nickel cadmium, or other battery systems. The hydrogen storage battery utilizes an anode which is capable of reversibly electrochemically storing hydrogen and usually employs a cathode of nickel hydroxide material. The anode and cathode are spaced apart in an alkaline electrolyte. Upon application of an electrical current to the anode, the anode material (M) is charged by the absorption of hydrogen:

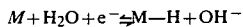

Upon discharge the stored hydrogen is released to provide an electric current:

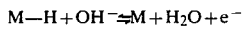

The reactions are reversible and this is also true of the reactions which take place at the cathode. As an example, the reactions at a conventional nickel hydroxide cathode as utilized in a hydrogen rechargeable secondary battery are as follows:

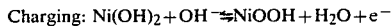

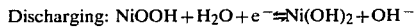

The battery utilizing an electrochemically hydrogen rechargeable anode offers important potential advantages over conventional secondary batteries. Hydrogen rechargeable anodes should offer significantly higher specific charge capacities than lead anodes or cadmium anodes. Furthermore, lead acid batteries and nickel-cadmium type secondary batteries are relatively inefficient, because of their low storage capacity and cycle life. A higher energy density should be possible with hydrogen storage batteries than these conventional systems, making them particularly suitable for battery powered vehicles and other mobile applications. Hydrogen storage batteries have not lived up to their potential, however, because of the materials and mechanical structures used.

An example of hydrogen storage materials which are not readily useable for battery applications is found in Japanese Patent Publication No. Sho53-164130 which was published July 11, 1980. A hydrogen storage metal material is disclosed with the composition formula

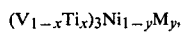

whereas M is Cr, Mn, Fe; $0.05 \leq x \leq 0.8$ and $0 \leq y \leq 0.6$. The temperature and pressure conditions for using this material for effective hydrogen storage, however, exceed the normal conditions at which commercially acceptable batteries safely operate. Other problems, like corrosion also must be alleviated if these hydrogen storage materials are used in a battery.

The preparation of hydrogen storage materials and fabrication of electrodes also are of utmost importance. It is desirable that the hydrogen storage materials be somewhat homogeneous to provide uniformity in their electrochemical properties. Often the individual components of the hydrogen storage materials are combined by melting the components together to form a bulk material such as an ingot. The hydrogen storage materials produced in this form are unsuitable for immediate use without further processing. Reducing the size of these bulk materials for fabrication as an electrode, however, can be quite difficult because of the unusual hardness and ductility of many hydrogen storage materials. Normal size reduction techniques which use such devices as jaw crushers, mechanical attritors, ball mills, and fluid energy mills often fail to economically reduce the size of such hydrogen storage materials. Thus, grinding and crushing operations for these materials have been complicated and the results have not been uniform.

Attempts to make metals brittle in order to crush them more easily are not new in the art. Prior methods, however, have involved mechanical addition of embrittling agents, the presence of which would have an undesirable effect on the electrochemical properties of the hydrogen storage materials.

Other methods for embrittling metals are disclosed in Canadian Pat. No. 533,208 granted to Brown. This patent identifies many disadvantages of treating vanadium metal with hydrogen gas to facilitate its crushing and, instead, recommends using cathodic charging as a successful size reduction technique. Although one is dissuaded from using hydrogen gas by the Brown patent, the present invention overcomes the disadvantages to provide a useful and commercially desirable technique of size reduction.

The previous attempts to utilize hydrogen storage materials in secondary batteries have proven unsuccessful because of the materials' poor electrochemical performance, structural instability, and expensive fabrication. The invention herein provides a new and improved battery and method of fabricating the same with an electrode incorporating an active material composition and structure allowing for high charge and discharge rates, efficient reversibility, high electrical efficiency, bulk hydrogen storage without substantial structural change or poisoning, mechanical integrity over long cycle life, and deep discharge capability.

SUMMARY OF THE INVENTION

The present invention includes an active material for an hydrogen storage electrode. The problems in prior art hydrogen storage materials discussed above are obviated by the present invention, all with improved electrochemical performance of the electrodes, cells, and batteries incorporating the novel active materials. The composition formula of the active material is selected from the group consisting of:

$$(TiV_{2-x}Ni_x)_{1-y}M_y \quad (a)$$

whereas, $0.2 \leq x \leq 1.0$, $0 \leq y \leq 0.2$ and $M = Al$ or $Zr$;

$$Ti_{2-x}Zr_xV_{4-y}Ni_y \quad (b)$$

whereas, $0 < x \leq 1.5$, $0.6 \leq y \leq 3.5$; and $$Ti_{1-x}Cr_xV_{2-y}Ni_y \quad (c)$$

whereas, $0 < x;23\ 0.75$, $0.2 \leq y \leq 1.0$.

The active materials of the present invention also have the following novel compositions. A first group of active material compositions incorporate the elements of titanium present in an amount between about 28 and 36 atomic percent, vanadium present in an amount between about 40 and 56 atomic percent and nickel present in an amount between about 10 and 22 atomic percent. A second composition group incorporates the elements of titanium present in an amount between about 15 and 20 atomic percent, vanadium present in an amount between about 15 and 40 atomic percent, zirconium present in an amount between about 10 and 20 atomic percent, and nickel present in an amount between about 30 and 55 atomic percent. A preferred third composition group incorporates titanium present in an amount between about 15 and 25 atomic percent, vanadium present in an amount between about 45 and 55 atomic percent, chromium present in an amount between about 5 and 25 atomic percent, and nickel present in an amount between about 10 and 25 atomic percent.

The active materials provided by the present invention also have novel structures. These materials may be single or multiphase combinations of amorphous, microcrystalline, or polycrystalline structures. Preferably, these materials have a multiphase polycrystalline structure. An active material for hydrogen storage electrode is provided by the present invention including a grain phase having means for reversibly storing hydrogen and a primary intergranular phase having means for catalyzing hydrogen oxidation. The primary intergranular phase is in operative contact with the grain phase.

The present invention provides an electrode for use in an electrochemical cell and a battery including a plurality of such electrochemical cells. The active material incorporated in each of these devices is described above.

A method of making an electrode using a hydrogen storage active material is also contemplated by the present invention. This method includes providing an active material of the composition and/or structure described above in a predetermined particle size distribution. Subsequently fabricating an electrode with the sized material.

The present invention also provides a method of making hydrogen storage active material for use in an electrode. The method includes the steps of providing an active material in bulk form having means for reversibly storing hydrogen and a homogeneous phase structure. Additional steps include hydriding the bulk material, dehydriding the bulk material, and pulverizing the bulk material to a predetermined particle size distribution.

The present invention also includes the method of sizing a hydride-forming metallic alloy. The method includes the steps of providing a hydride-forming metallic alloy in bulk form and hydriding the bulk alloy. Then the method includes dehydriding the bulk alloy and pulverizing the alloy to a predetermined particle size distribution.

DETAILED DESCRIPTION OF THE DRAWINGS

FIG. 10 is a graph of the cell capacity versus cycle life of an inventive electrode incorporating an inventive active material of the third composition group.

DETAILED DESCRIPTION OF THE INVENTION

Figure 1:
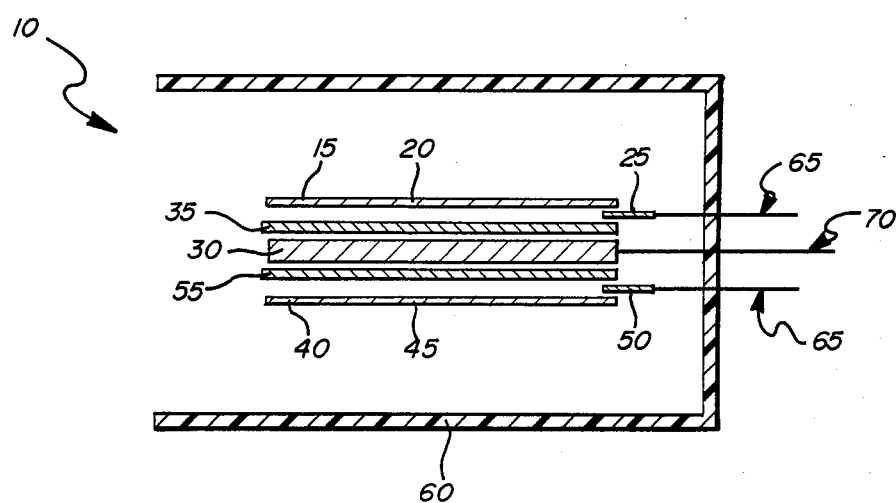
FIG. 1 is a cutaway side view of a flat cell embodiment using an inventive electrode and active material.

Generally, the present invention provides novel active materials which reversibly store hydrogen under conditions which make them exceptionally well-suited for electrochemical applications. These active materials have both novel compositions and structures. A first group of active material compositions incorporate the elements of titanium, vanadium, and nickel. A second composition group adds zirconium to the first group of active materials. A preferred third composition group adds chromium to the first group of active materials. These materials may be single or multiphase combination of amorphous, microcrystalline, or polycrystalline structures. Preferably, these materials have a multiphase polycrystalline structure.

The inventive active materials may be prepared by several methods disclosed herein. A method of reducing the size or sizing these materials, as well as other hydrideforming alloys, also is provided. Methods of fabricating inventive hydrogen storage electrodes from these active materials are contemplated. The inventive electrodes are adaptable to assembly as cells with various configurations such as a jelly-roll or flat configuration. Electrochemical cells and batteries assembled with the inventive electrodes provide significantly improved capacity and cycle life.

In particular, the present invention provides active materials having three primary groups of compositions which absorb and store hydrogen and subsequently release at least a portion of the stored hydrogen to provide a supply of electrons. Suitable active materials of the first composition group include titanium present in an amount greater than about 28 and less than about 36 atomic percent, vanadium present in an amount greater than about 40 and less than about 56 atomic percent, and nickel present in an amount greater than about 10 and less than aout 22 atomic percent. A preferred active material in this group includes about 33 atomic percent of titanium, 53 atomic percent of vanadium, and 14 atomic percent of nickel.

In addition to the above components, the first group of compositions may also include aluminum and/or zirconium present in an amount less than about 10 atomic percent. If one or both of these elements are incorporated, a preferred amount is about 7 atomic percent of zirconium and/or about 5 atomic percent of aluminum.

More specifically, the first composition group includes active materials which are represented by the composition formula $$(TiV_{2-x}Ni_x)_{1-y}M_y$$

whereas, $0.2 \leq x \leq 1.0$; $0 \leq y \leq 0.2$; and M=Al or Zr. Preferably, $y=0$ and $0.40 \leq x \leq 0.45$.

The structures of the compositions disclosed herein were characterized by x-ray diffraction, scanning electron microscopy, and energy dispersive x-ray analysis. The types of structure provided by the invention included both single and multiple phases. An individual phase may have a structure which is amorphous, microcrystalline, or polycrystalline (with or without long range order). An active material with multiple phases may have any combination of these structures. Preferably, the active materials of all three composition groups have a multiphase polycrystalline structure.

In particular, the preferred multiphase polycrystalline structure of the active materials in the first composition group includes a grain phase which is a solid solution of titanium and vanadium with dissolved nickel. The titanium and vanadium act as hydrogen storage components while the nickel functions as catalyst and also lowers the heat of reaction with hydrogen. The composition of this phase varies from about 20:80 to 30:70 as a ratio of titanium:vanadium measured in atomic percent. The dissolved nickel is present in an amount between about 4 to 8 atomic percent.

Between the grain phases of the preferred polycrystalline structure is a primary intergranular phase including a titanium and nickel intermetallic compound with dissolved vanadium. Such an intermetallic compound exhibits distinct phases where the constituent atoms are in fixed integral ratios and is held together by metallic bonding to usually form a crystal structure. The primary intergranular phase contains approximately equal amounts of titanium and nickel, and the dissolved vanadium is present in an amount between about 6 to 8 atomic percent. This phase functions as a catalyst for hydrogen oxidation of the primary hydrogen storage grain phase. The titanium and nickel intermetallic compound stores less hydrogen than the grain phase and acts as a channel for hydrogen oxidation. The vanadium dissolved in the primary intergranular phase increases the hydrogen storage capacity of this phase and the heat of reaction with hydrogen.

Several other phases also may be present in these materials. For example, the grain phase may be at least partially surrounded by a grain boundary phase which is a non-equilibrium equilibrium solid solution of titanium and vanadium with dissolved nickel. Such a non-equilibrium phase is not in its lowest energy configuration and may exhibit concentration gradients within the phase. A composition of the grain boundary phase is between about 45:55 to 55:45 as a ratio of titanium:vanadium measured in atomic percent. The dissolved nickel is present in an amount between about 10 to 14 atomic percent.

Another example is a non-equilibrium phase which includes $Ti_2Ni$ with dissolved vanadium present in an amount between about 7 to 13 atomic percent. Still another phase may be the vanadium rich side of the titanium and vanadium binary.

As previously mentioned, the preferred structures of the three composition groups were characterized by x-ray diffraction. The major identified peaks of the preferred polycrystalline structure of the first composition group occurred at d-spacings of 2.26 Å to 2.10 Å, 1.55 Å to 1.48 Å, and 1.27 Å to 1.21 Å. The primary hydrogen storage grain phase of the preferred structures is a single phase alloy which exhibits d-spacings closely corresponding to a vanadium structure with its lattice parameters shifted due to the incorporation of varying amounts of other components like titanium and nickel. Other small peaks of the x-ray spectrum may be associated with the intergranular and/or grain boundary phases found in the material. The occurrence of the peaks in the x-ray diffraction spectrum depends on its composition and preparation history.

A second composition group contemplated by the present invention as an active material for an hydrogen storage electrode includes titanium present in an amount greater than about 15 and less than about 20 atomic percent, vanadium present in an amount greater than about 15 and less than about 40 atomic percent, zirconium present in an amount greater than about 10 and less than about 20 atomic percent, and nickel present in an amount greater than about 30 and less than about 55 atomic percent. Preferably, a composition includes approximately 17 atomic percent titanium, 33 atomic percent vanadium, 16 atomic percent zirconium, and 34 atomic percent nickel. A second preferred composition includes approximately 17 atomic percent titanium, 20 atomic percent vanadium, 16 atomic percent zirconium, and 47 atomic percent nickel.

More specifically, the second composition group includes active materials which are represented by the composition formula $$Ti_{2-x}Zr_xV_{4-y}Ni_y$$

whereas $0 < x \leq 1.5$ and $0.6 \leq y \leq 3.5$. Preferably, $0.95 \leq x \leq 1.05$ and $y=2$ or $3$.

The preferred multiphase polycrystalline structure of the active materials in the second composition group also includes a grain phase which is a intermetallic compound of vanadium, titanium, zirconium, and nickel. Again, the grain phase reversibly stores hydrogen. A composition of this grain phase is about 26:16:22:36 as a ratio of vanadium:titanium:zirconium:nickel measured in atomic percent.

Between the grain phases of the preferred polycrystalline structure is a primary intergranular phase including a titanium, zirconium, and nickel intermetallic compound with dissolved vanadium. A composition of this primary intergranular phase is about 25:20:46 as a ratio of titanium:zirconium:nickel measured in atomic percent. The dissolved vanadium is present in an amount of about 9 atomic percent.

Several other phases also may be present in these materials. For example, the grain phase may be at least partially surrounded by a grain boundary phase which is a non-equilibrium phase incorporating titanium, vanadium, zirconium, and nickel. A composition of the grain boundary phase is about 19:20:22:39 as a ratio of titanium:vanadium:zirconium:nickel as measured in atomic percent.

The x-ray diffraction analysis of the preferred crystalline structure of the second composition group identified peaks at d-spacings of 2.30 Å to 2.07 Å and 1.40 Å to 1.24 Å. Other small peaks of the x-ray spectrum may be associated with the intergranular and/or grain boundary phases found in the material. The occurrence of the peaks in the x-ray diffraction spectrum depends on its composition and preparation history.

A third composition group contemplated by the present invention as an active material for an hydrogen storage electrode includes titanium present in an amount greater than about 5 and less than about 25 atomic percent, vanadium present in an amount greater than about 40 and less than about 55 atomic percent, chromium present in an amount greater than about 5 and less than about 25 atomic percent, and nickel present in an amount greater than about 10 and less than about 25 atomic percent. Preferably, a composition would have approximately 17 atomic percent titanium, 53 atomic percent vanadium, 17 atomic percent chromium, and 13 atomic percent nickel.

More specifically, the third composition group includes active materials which are represented by the composition formula

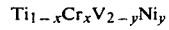

$$Ti_{1-x}Cr_xV_{2-y}Ni_y$$

whereas, $0 < x \leq 0.75$; $0.2 \leq y \leq 1.0$. Preferably, $0.45 \leq x \leq 0.55$ and $0.4 \leq y \leq 0.6$.

The preferred structure of the active materials in the third composition group is a multiphase polycrystalline structure. The active materials include a grain phase which is a solid solution of titanium, vanadium, and chromium with dissolved nickel. The titanium, vanadium, and chromium act as the hydrogen storage components while the nickel functions as a catalyst and lowers the heat of reaction with hydrogen. A composition of the grain phase is between about 60 to 70 atomic percent of vanadium, 20 to 30 atomic percent of chromium, 3 to 10 atomic percent of titanium, and 3 to 10 atomic percent of nickel.

Between the grains is an intergranular phase including a titanium, vanadium, and nickel intermetallic compound with dissolved chromium. The intergranular phase functions as a hydrogen oxidation catalyst for the utilization of the primary hydrogen storage grain phase. The intergranular phase also stores hydrogen, but to a significantly lesser degree than the grain phase. A composition of this phase is between about 20 to 50 atomic percent of titanium, 40 to 50 atomic percent of nickel, 5 to 20 atomic percent of vanadium, and 1 to 5 atomic percent of chromium. The actual composition and the volume fraction of each phase depends on the thermal history of its preparation and processing as previously discussed.

The grain phase may be surrounded by a grain boundary phase which is a solid solution of titanium and vanadium with dissolved chromium and nickel. A composition and volume amount of this phase depends on its thermal history of preparation and processing.

The preferred structures of all three composition groups may be characterized by a suitable size for the polycrystalline phases. The grain phase may vary between about 10 to 100 microns in diameter. The intergranular phase width may vary between about 1 to 20 microns. The preferred size of the grain phase is about 25 microns with an intergranular phase of about 3 microns in width.

The preferred structures for all three composition groups may be characterized by the volume amounts of the individual polycrystalline phases. A suitable volume amount of a grain phase is about 75% to 95% with a primary intergranular phase presents in substantially the remaining volume amount. A grain boundary phase or other intergranular phases, if any, would be present in an amount of about 2%.

The volume amounts of the non-equilibrium phases present in the active material depend on the preparation of the material. The means of processing as well as the thermal history of preparing the active material and fabricating the electrode determine the volume amounts of any non-equilibrium phase.

The present invention also provides the hydrides of the active materials in each of the composition groups. The hydrides of the first composition group preferably incorporate about 3.8 weight percent of hydrogen. The hydrides of the second composition group preferably incorporate about 1.2 weight percent of hydrogen. The hydrides of the third composition group preferably incorporate about 1.4 weight percent of hydrogen.

The x-ray diffraction analysis of the preferred polycrystalline structure of the third composition group identified peaks at d-spacings similar to that found for the preferred polycrystalline structures of the first composition group. Likewise, the primary hydrogen storage grain phase of the preferred structures is a single phase alloy which exhibits d-spacings closely corresponding to a vanadium structure with its lattice parameters shifted due to the incorportion of varying amounts of other components like titanium, chromium, and nickel.

The present invention contemplates a number of methods for preparing the above described active materials. Suitable methods reproducibly prepare the materials with both composition and structure that is somewhat homogeneous. It was found that appropriate amounts of the individual components of the material could be starting reactants in a melting process to form a bulk composition or ingot. Although not limited to a melting process to form the material, the invention contemplates conventional techniques such as arc-melting and preferably induction melting for their preparation.

Once the materials were formed in bulk, it became necessary to reduce the material to a more appropriate size. Conventional sizing techniques like those previously mentioned did not prove suitably effective from a commercial standpoint. Air hammering eventually was selected, but still was considered commercially undesirable.

It was then discovered that through a novel hydriding process, the materials could be embrittled, making pulverization much easier and more economical. The hydriding process includes the steps of hydriding the active material in bulk forms and dehydriding the active material either before or after pulverizing the material to the appropriate size. The hydriding step changes the physical form of the material from a hard, tough ingot into a flaky, ash-like consistency. This ash-like material is readily pulverized.

The hydriding step includes contacting the bulk material with hydrogen gas under the appropriate temperature, pressure, and time conditions to form the hydride of the material. More specifically, an ingot of the material may be placed in a reaction vessel. The vessel is subsequently sealed and evacuated. Generally, a pressure of about $10^{-3}$ torr is suitable. The vessel is then pressurized with hydrogen gas between about 100 to 2000 psi. Generally, maintaining a partial pressure of hydrogen above about 200 psi. for a few minutes is sufficient to form the hydride at room temperature. These conditions depend on the composition of the material and its geometry. Materials that have a slower diffusion rate or low interstitial mobility for hydrogen will require more time for suitable embrittlement. The factors that effect the mobility of hydrogen through the phase regions and of the material's structure will determine the pressure, time, and temperature necessary to form a hydride of the material and effectuate suitable embrittlement.

The vessel may be cooled during the hydriding step to prevent any temperature increase. The temperature inside the vessel rises as the material is exposed to the hydrogen due to the exothermic nature of the hydride formation reaction (approximately 10 Kcal./mole for these materials). Without any cooling, the temperature inside the vessel usually elevates to about 250° C. A temperature increase delays the formation of the hydride. The hydriding reaction spontaneously starts upon exposure to hydrogen gas. If a barrier or passivation layer forms on the surface of the material which prevents contact with the hydrogen gas, the layer should be removed. For example, if an oxide layer forms on the material, the hydrogen initially will slowly penetrate. Initial heating of the material accelerates the hydriding step. Once a portion of the material's surface is cleaned of the layer, the hydriding reaction proceeds rapidly without further assistance.

Hydride formation of a material batch is governed by the ideal gas law. Sufficient embrittlement for easy size reduction of some materials does not require complete hydride formation. For example, with a material such as $Ti_{53}Ni_{33}V_{14}$ which absorbs 2.5 weight percent hydrogen, it was found that hydriding to at least about 1.5 weight percent hydrogen provides sufficient embrittlement. Using the ideal gas law and the amount of hydrogen absorbed for sufficient embrittlement, the reaction vessel necessary to embrittle a given batch of material can be readily calculated.

Another step of the novel process is the dehydriding of the material. Dehydriding the material takes place after the material has been sufficiently embrittled by hydride formation. The hydride is returned to the metallic form of the material.

Specifically, dehydriding includes evacuating the vessel with the hydride still inside the reaction vessel and with heating for a sufficient time period to induce release of the incorporated hydrogen. The material should be kept at a temperature sufficiently low to avoid changing the structure of the material. A temperature below 600° C. is usually suitable. The dehydriding step is more quickly completed as the temperature increases. Thus, a temperature of about 400° C. is preferred. As the hydrogen is removed from the vessel it may be compressed and recycled since it is largely uncontaminated.

After the hydrogen is removed, the material is cooled to room temperature in an inert environment like argon. The resultant material has the ash-like features of the hydride and is relatively inert to atmospheric reaction.

Pulverization of the embrittled material may be accomplished by any conventional device such as mechanical attritors, jaw crushers, air-hammer, hardened steel mortar and pestle, or ball-milling. Ball-milling the material gives a particle size distribution especially useful for the fabrication of hydrogen storage electrodes. The particle size of the material may be varied depending upon the application. The flakes resulting from the embrittlement process are usually about one mm. in diameter. Care must be taken during the pulverization process not to expose the pulverized material to any conditions which may allow water or oxygen to contact or react with the pulverized alloy. Using other pulverization techniques will produce different distributions of particle sizes, as well as different particle shapes.

It is important, although not critical, that the pulverizing step follow the dehydriding step. Several significant advantages are demonstrated if the preferred sequence of steps is followed. First, the hydrided form of the material is very reactive with certain gases like oxygen which would deleteriously offset the electrochemical properties of the material. Pulverizing the material after dehydriding reduces the likelihood of contamination. This is not critical because the material could be pulverized in the hydride form without contamination if care were taken to provide an inert environment. The complexity of the procedure, however, makes it less likely to be economically feasible. Second, a single vessel may be used to hydride and dehydride the material without transporting the material between steps. Thus, contamination and costly handling are avoided.

The novel hydriding process provided herein, may be in the preparation of materials other than the disclosed active material. Other materials suitable for size reduction with the inventive process are hydride formers.

The present invention contemplates the fabrication of an hydrogen storage electrode from an active material of the composition or structure previously discussed. The active material may be sized to an appropriate particle distribution for preparing the electrodes. Although the material may be of any convenient particle size, we have found that the preferred compositions described above demonstrate the highest electrochemical capacity where the material has been sized to approximately $38\mu$ or about $-400$ mesh.

The fabrication of the electrodes using the above described active material may be carried out by several conventional processes. Preferably, the active materials were mixed with a binder such as nickel in the amount of about 7%. Other binders which promote the mechanical stability of the electrode without deleteriously effecting its electrochemical properties are suitable. This active material and binder was then placed in contact with a current collector. Although nickel mesh screen was used, other current collecting means also are suitable.

The material was then pressed to a pressure of about 7 to 10 tons/sq.cm. Various conventional methods for effectuating the pressure are contemplated by the present invention.

These materials are then sintered in the range of 800° to 1200° C. for a period of several minutes to an hour. Preferably, a temperature of about 1050° C. is used for about five minutes. As the temperature of the sintering process decreased the length for sintering increased. It is economically preferred to have a higher sintering temperature for a shorter period of time.

The present invention also contemplates an electrochemical cell which includes at least one electrode means for storing energy. The electrode means is formed from an active material of the composition or structure previously discussed. The cell also includes at least one counter electrode means providing for the release of the energy stored in said electrode means. The counter electrode means is spaced in operative contact with the electrode means. The cell also includes a casing which has the electrode means and the counter electrode means positioned therein. The counter electrode means includes an electrolyte placed in operative contact with the electrode means and the counter electrode means. A plurality of these cells may be assembled to produce a hydrogen storage battery.

Various electrochemical cell embodiments utilizing the inventive active material compositions are contemplated. Referring to FIG. 1, a flat cell 10 is illustrated which uses at least one substantially flat plate 15 incorporating the active material described above. Interleaved between the active material is a current collector 20 which is in electrical contact with the active material and a tab 25. The collector 20 and tab 25 may be made of suitably conductive metals such as nickel. The flat cell 10 includes a counter electrode 30 which is substantially flat and aligned to be in operative contact with plate 15. A separator 35 is disposed between the counter electrode 30 and the plate 15.

A second substantially flat plate 40 may be spaced in operative contact with the counter electrode 30 on the side opposite the first plate 15. Similarly interleaved between the active material is a current collector 45 which is in electrical contact with the active material and the tab 50. A second separator 55 is disposed between the second plate 40 to electrically contact the tab 50 and the counter electrode 30.

The cell 10 depicted in FIG. 1 may be sealed in a suitable material, such as a plastic wrap 60, which does not deteriorate in contact with the electrolyte used and allows venting of the cell 10 should it gas during operation. The first and second tabs 25, 50 are electrically connected to first set of leads 65 which extends outside of the cell plastic 60. Likewise, a second lead 70 electrically connects to the counter electrode 30 and extends outside of the cell plastic 60.

Figure 2:
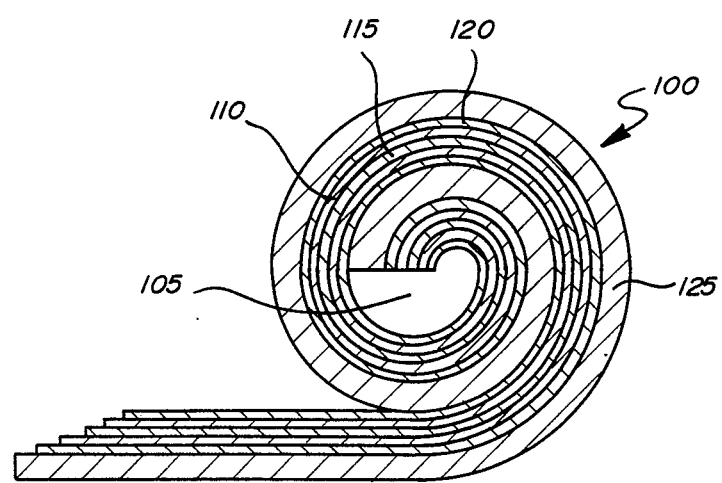
FIG. 2 is a side view of a jelly-roll cell embodiment using an inventive electrode and active material.

FIG. 2 illustrates a commercially preferred jelly-roll cell 100 which is made by spirally winding a flat cell about an axis 105. The jelly roll cell may then be placed in a can which contains a conductive electrolyte (not shown) which contacts the tabs 110 interleaved with the plate 115 of the material described above. A separator 120 is spaced between the sheets 115 and a counter electrode 125.

EXAMPLE 1

A first group of compositions represented by the formula

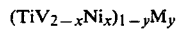

$(TiV_{2-x}Ni_x)_{1-y}M_y$ whereas, $0.2 \leq x \leq 1.0$; $0 \leq y \leq 0.2$; and M=Al or Zr. Compositions having these specific formulae presented in Table 1 were prepared by weighing and mixing powders of the individual components each having a purity in excess of 99.7%. Each mixture was pressed in to a pellet and melted by induction melting in an argon atmosphere. The ingot was cooled by an ice bath and then crushed with an air hammer. Chunk samples ranging up to 1.0 mm. in length and 250 mg. in weight were chosen for electrochemical testing.

Each chunk sample of a composition was squeeze wrapped by a pure nickel screen basket about 1 cm.[2] and placed in a 4M KOH solution with a platinum counter electrode and an $Hg/H_gO$ reference electrode. The open circuit voltage was about $-0.970$ volt vs. $Hg/H_gO$ the electrochemical capacity of each composition measured at a 50 mA/g discharge rate is represented in Table 1.

TABLE 1

| ELECTROCHEMICAL CAPACITY OF $(TiV_{2-x}Ni_x)_{1-y}M_y$ AT 50 mA/g DISCHARGE RATE | |
|---|---|
| MATERIAL (Atomic Percent) | CAPACITY (mAh/g) |
| $V_{53}Ti_{33}Ni_{14}$ | 370 |
| $V_{47}Ti_{33}Ni_{20}$ | 310 |
| $V_{50.8}Ti_{31.7}Ni_{12.7}Al_{4.8}$ | 328 |
| $V_{49.5}Ti_{33}Ni_{12.4}Al_{5.1}$ | 400 |

Figure 3:
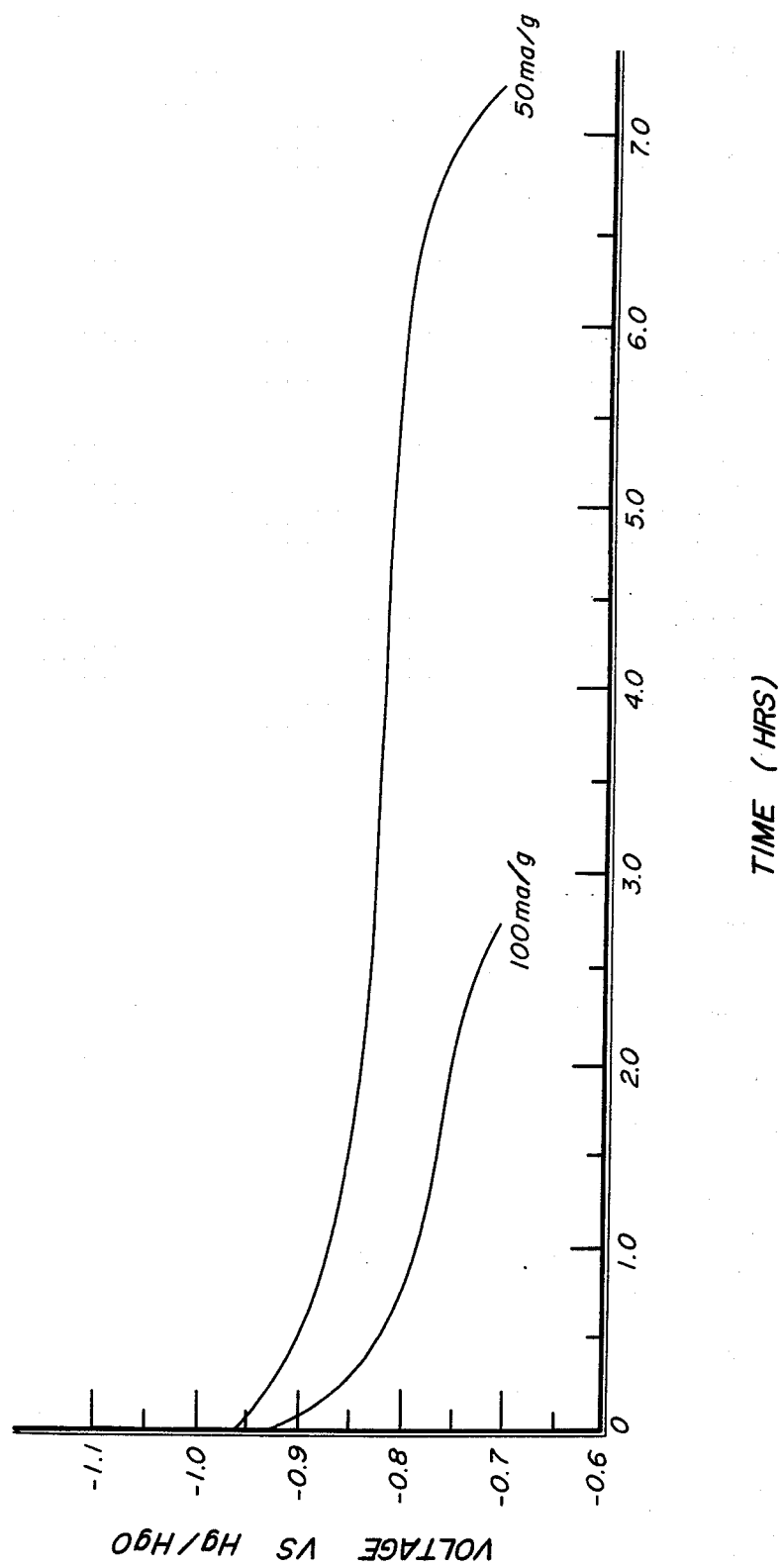
FIG. 3 is a graph of representative discharge currents versus time for an inventive active material of the first composition group in chunk form.

FIG. 3 demonstrates the discharge rate capability of $V_{53}Ti_{33}Ni_{14}$ material from this group in chunk form at representative discharge rates versus time.

Figure 4:
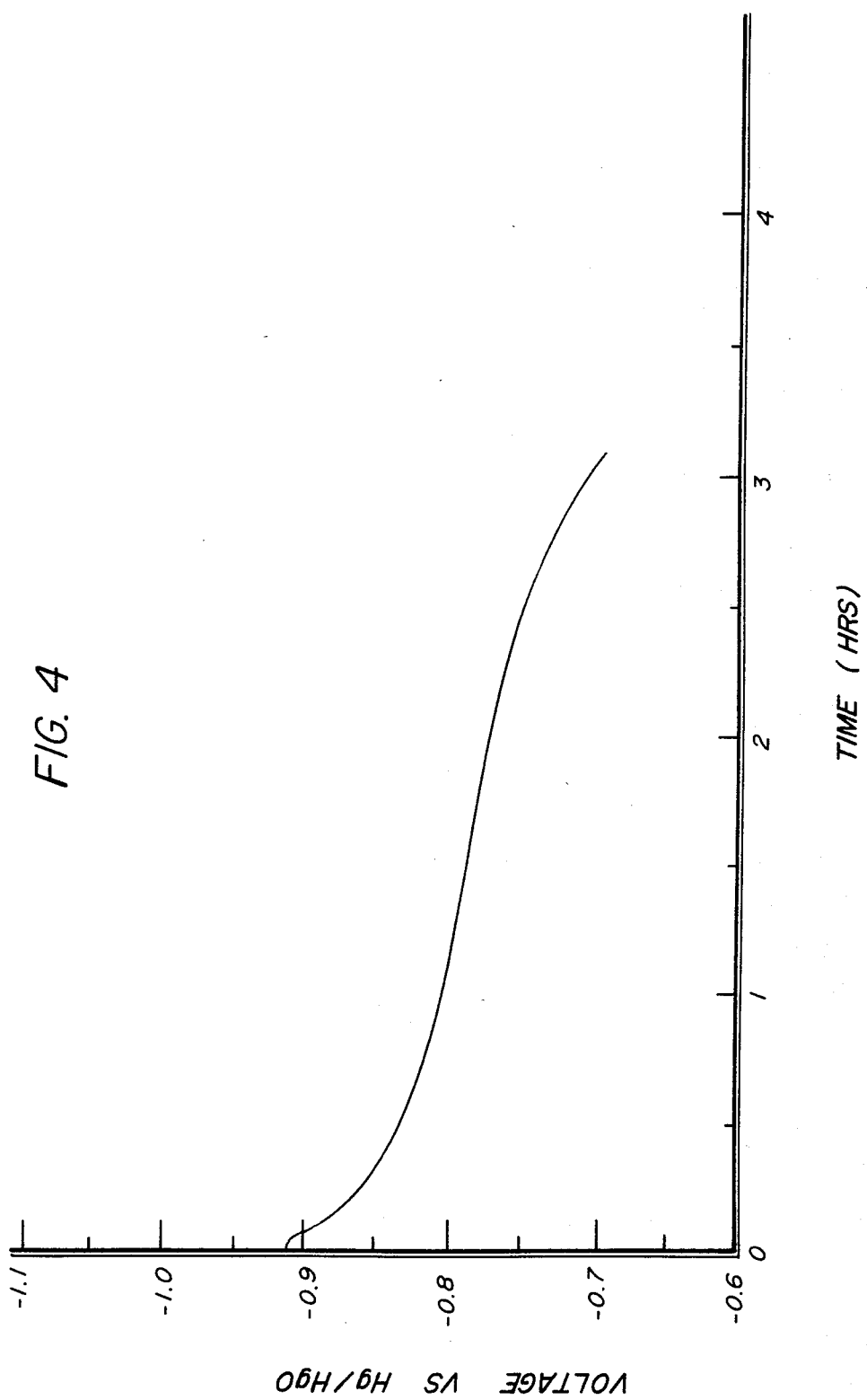
FIG. 4 is a graph of representative discharge current versus time for an inventive active material of the first composition group in electrode form.

A powder sample of a $V_{53}Ti_{33}Ni_{14}$ was provided by subjecting the composition to an air hammer to achieve a $-400$ mesh (equivalent to approximately 38 micron diameter particle size). The powder was positioned over a pure nickel grid and pressed to 7 tons/sq. cm. Subsequently, the electrode was sintered at 825° C. for one hour. The electrochemical capacity of each powder composition was measured in a 4M KOH solution with a platinum counter electrode and an $Hg/H_gO$ reference electrode. The electrochemical capacity was measured at a discharge rate of 50 mA/g and the discharge rate capability of $V_{53}Ti_{33}Ni_{14}$ at representative discharge rates versus time in FIG. 4.

The cycle life of the first group of compositions was measured by testing certain representative compositions as either a chunk sample or a powder sample. For instance, a chunk sample of $V_{53}Ti_{33}Ni_{14}$ cycled for more than 10 cycles in 4M KOH at a charge rate of 100 mA/g for 6 hours and a discharge rate of 100 mA/g to $-0.700$ volt vs. $Hg/H_gO$ reference electrode. No significant degradation was observed.

EXAMPLE 2

A second group of compositions represented by the formula

$Ti_{2-x}Zr_xV_{4-y}Ni_y$ wherein $0 < x \leq 1.5$; $0.6 \leq y \leq 3.5$. Compositions having the specific formulae presented in Table 2 were prepared by weighing and mixing powders of the individual components each having a purity in excess of 99.5%. Each mixture was pressed into a pellet and melted by induction melting in an argon atmosphere. The ingot was cooled by an ice bath and then crushed with an air hammer. Chunk samples ranging up to 1.0 mm. thick and 300 mg. in weight were chosen for electrochemical testing.

A chunk sample of each composition was squeeze wrapped by a pure nickel screen basket about 1 cm.² and placed in a 4M KOH solution with a platinum counter electrode and an Hg/H$_g$O reference electrode. The open circuit voltage was about $-0.970$ volts vs. Hg/H$_g$O. The electrochemical capacity of each composition was measured at 50 mA/g discharge rate is represented in Table 2.

TABLE 2

ELECTROCHEMICAL CAPACITY OF $Ti_{2-x}Zr_xV_{4-y}Ni_y$ AT 50 mA/g DISCHARGE RATE

| MATERIAL (Atomic Percent) | CAPACITY (mAh/g) |
|---|---|
| $Ti_{17}V_{17}Zr_{16}Ni_{50}$ | 240 |
| $Ti_{17}V_{20}Zr_{16}Ni_{47}$ | 310 |
| $Ti_{17}V_{25}Zr_{16}Ni_{42}$ | 265 |
| $Ti_{17}V_{33}Zr_{16}Ni_{34}$ | 320 |

Figure 5:
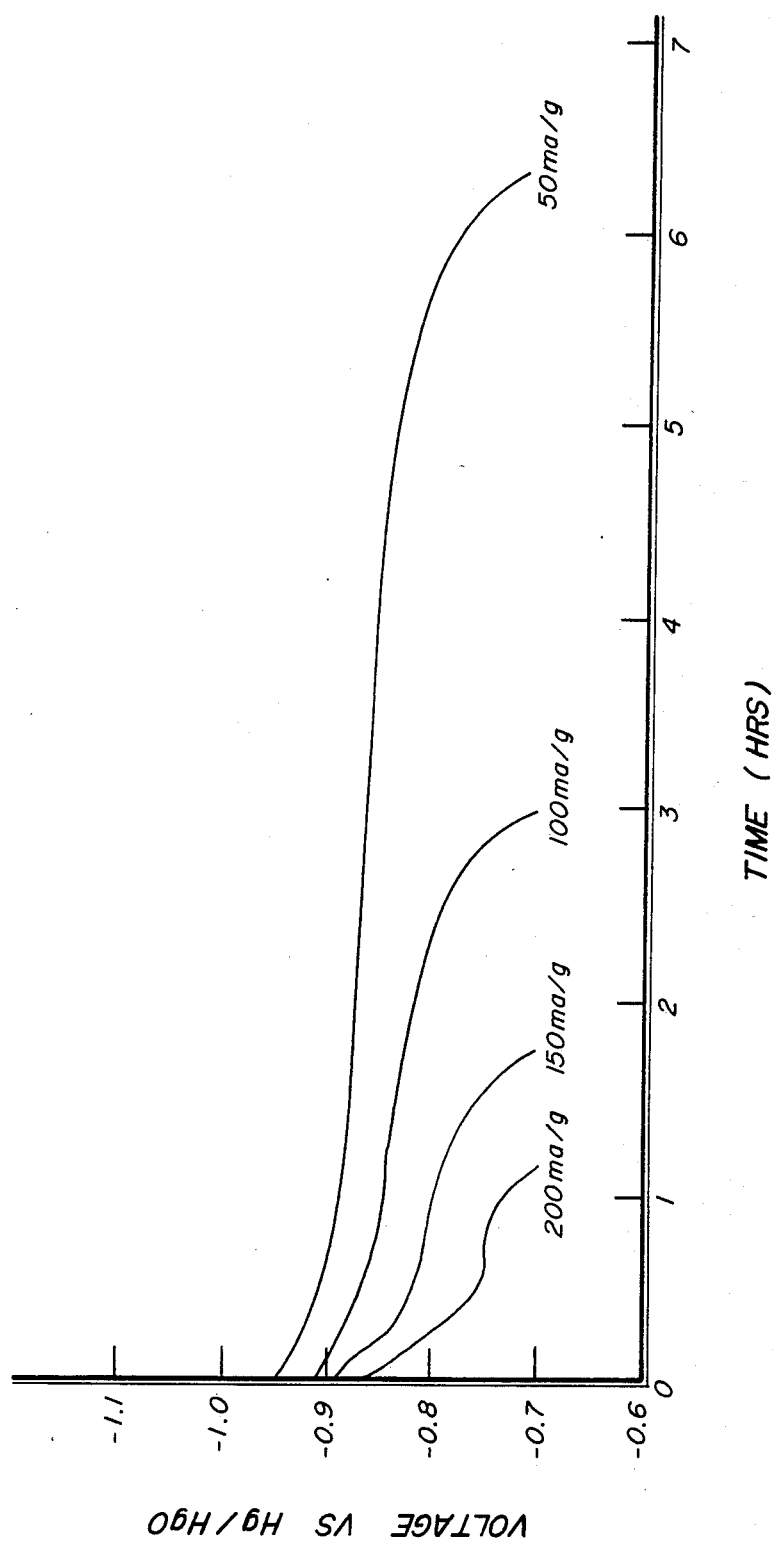
FIG. 5 is a graph of representative discharge currents versus time for an inventive active material of the second composition group in chunk form.

FIG. 5 demonstrates the discharge rate capability of a sample material from this group in chunk form at representative discharge rates versus time.

The cycle life of this third group of compositions was measured by testing a representative composition as a chunk sample. Particularly, the composition $Ti_{17}V_{33}Zr_{16}Ni_{34}$ completed more than 120 cycles in 4M KOH at a charge rate of 200 mA/g for 3 hours and a discharge rate of 100 mA/g to $-0.720$ volt vs. Hg/HgO reference electrode. No significant degradation was observed.

EXAMPLE 3

A third group of compositions represented by the formula

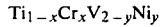

whereas $0 < x \leq 0.75$ and $0.2 \leq y \leq 1.0$. Three compositions having the specific formulae presented in Table 3 were prepared by weighing and mixing powders of the individual components each having a purity in excess of 99.5%. Each mixture was pressed into a pellet and melted by induction melting in an argon atmosphere. The ingot was cooled by an ice bath and then crushed with an air hammer. Chunk samples ranging up to 1.0 mm thick and 300 mg. in weight were chosen for electrochemical testing.

A chunk sample of each composition was squeeze wrapped by a pure nickel screen basket about one sq. cm. and placed in a 4M KOH solution with a platinum counter electrode and an Hg/HgO reference electrode. The open circuit voltage was about $-0.970$ volt vs. Hg/HgO. The electrochemical capacity of each composition measured at a 50 mA/g discharge rate is represented in Table 3.

TABLE 3

ELECTROCHEMICAL CAPACITY OF $Ti_{1-x}Cr_xV_{2-y}Ni_y$ AT 50 mA/g DISCHARGE RATE

| MATERIAL (Atomic Percent) | CAPACITY (mAh/g) |
|---|---|
| $Ti_{20}Cr_{13}V_{54}Ni_{13}$ | 300 |
| $Ti_{17}Cr_{17}V_{53}Ni_{13}$ | 350 |
| $Ti_{25}Cr_8V_{47}Ni_{20}$ | 260 |
| $Ti_8Cr_{25}V_{47}Ni_{20}$ | 200 |
| $Ti_{16}Cr_{16}V_{47}Ni_{21}$ | 280 |

Figure 6:
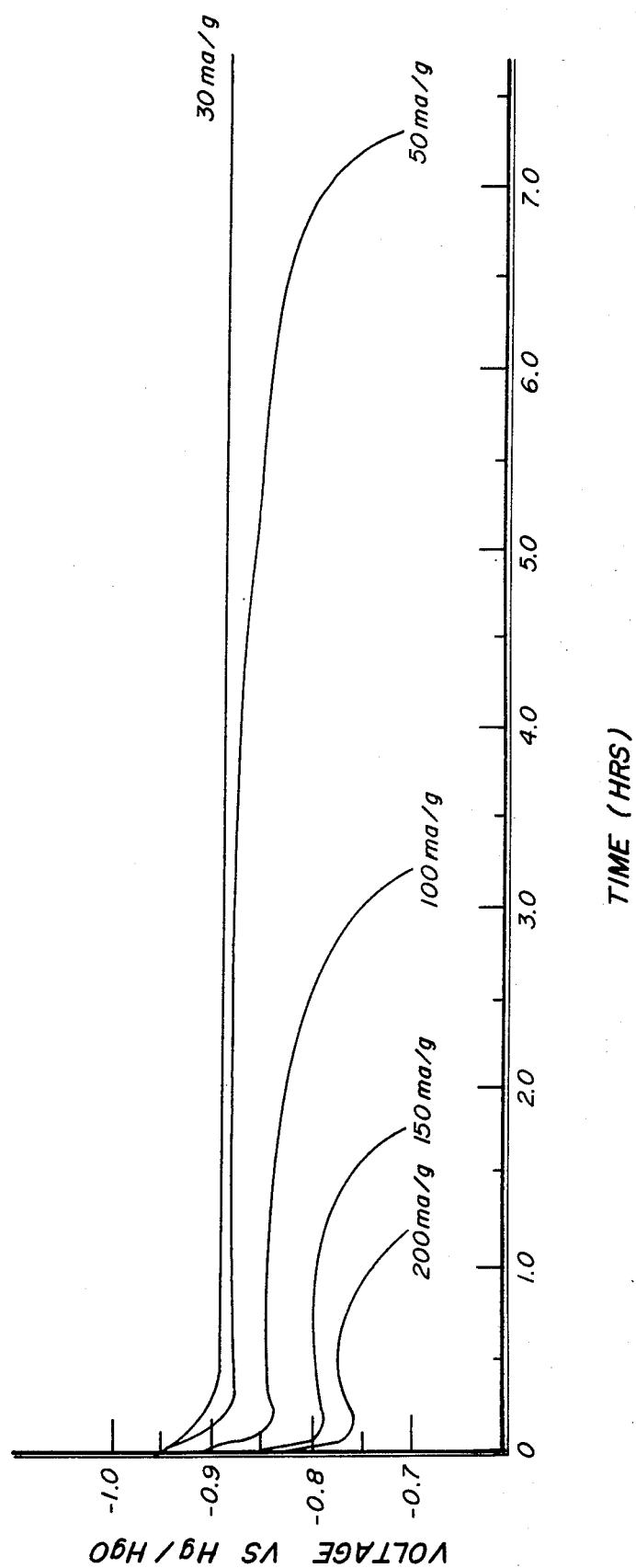
FIG. 6 is a graph of representative discharge currents versus time for an inventive active material of the third composition group in electrode form.

FIG. 6 demonstrates the discharge rate capability of a sample material from this group in chunk form at representative discharge rates versus time.

Figure 7:
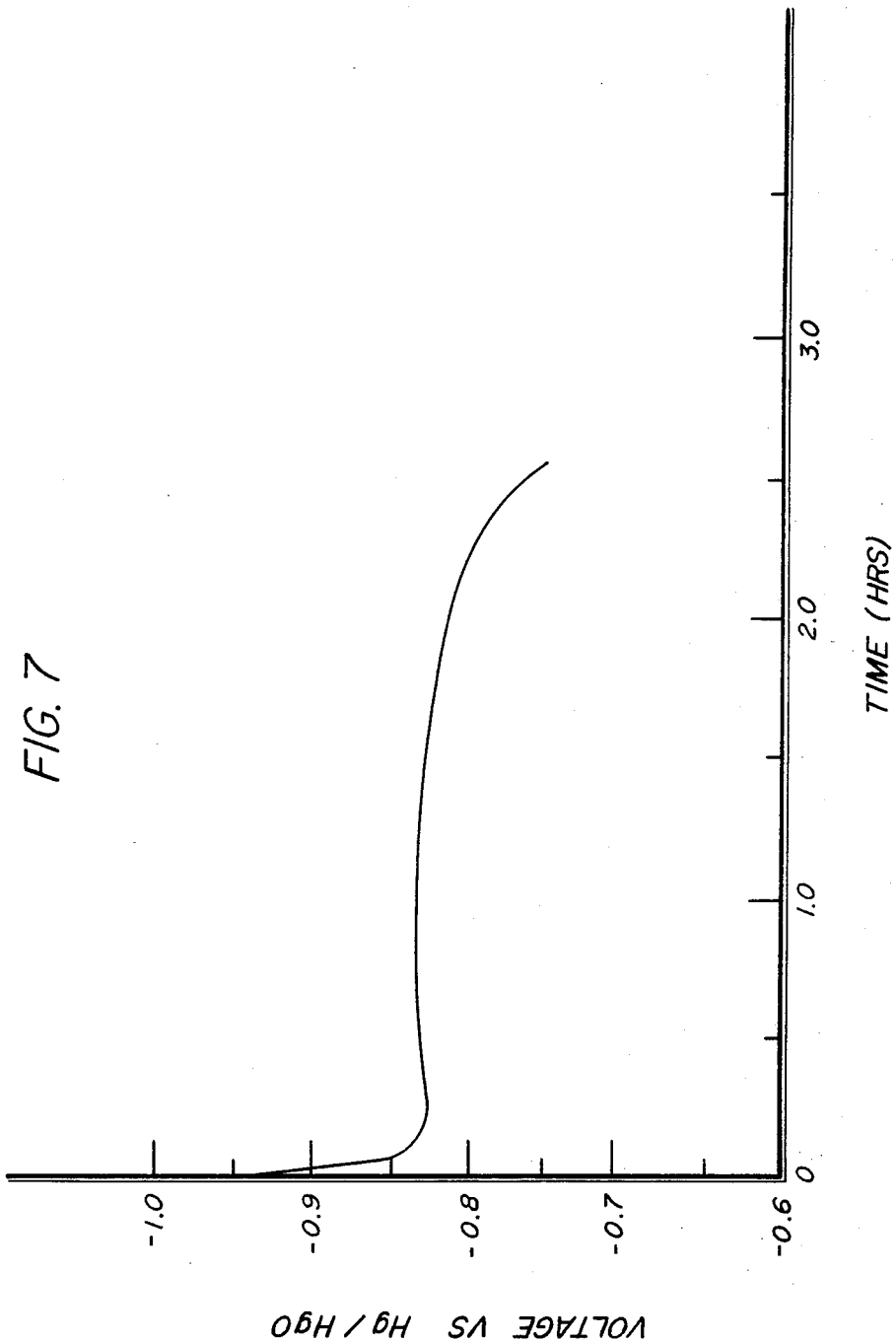
FIG. 7 is a graph of representative discharge current versus time for an inventive active material of the third composition group in electrode form.

A powder sample of a $Ti_{17}Cr_{17}V_{53}Ni_{13}$ was provided by subjecting the composition to an air hammer to achieve a $-400$ mesh. The powder was positioned over a pure nickel grid and pressed to 10 tons/sq. cm. Subsequently, the electrode was sintered at 1050° C. for 5 minutes. The electrochemical capacity of each powder composition was measured in a 4M KOH solution with a platinum counter electrode and an Hg/HgO reference electrode. The electrochemical capacity was measured at a discharge rate of 50 mA/g and the discharge rate capability at representative discharge rates versus time in FIG. 7.

The cycle life of this second group of compositions was measured by compositions as both a chunk sample and a powder sample. For instance, a chunk sample of $Ti_{17}Cr_{17}V_{53}Ni_{13}$ cycled for more than 150 cycles in 4M KOH at a charge rate of 100 mA/g for 6 hours and a discharge rate of 100 mA/g to $-0.720$ volt vs. Hg/HgO reference electrode. No significant degradation was observed.

EXAMPLE 4

An ingot of a $Ti_{33}Ni_{14}V_{53}$ material was made by weighing out respective amounts of the elemental metals, melting them together, and allowing it to cool to room temperature. Two hundred grams of the material was placed into a reaction vessel with an interior volume of about 1 liter. The vessel was leak tight to both vacuum and pressurized gas. The vessel was evacuated to $10^{-3}$ torr and pressurized to about 600 psi. with commercial grade hydrogen gas. The material was allowed to stand for about 10 hours. Without breaking the seal, the hydrogen gas was removed. The vessel was heated to 400° C. for several hours until the hydrogen pressure coming out of the vessel was negligible. Argon was introduced and the reactor was allowed to cool to room temperature. After the seal was broken, the ingot was observed to have been reduced to flakes and powders of an ash-like consistency.

Figure 8:
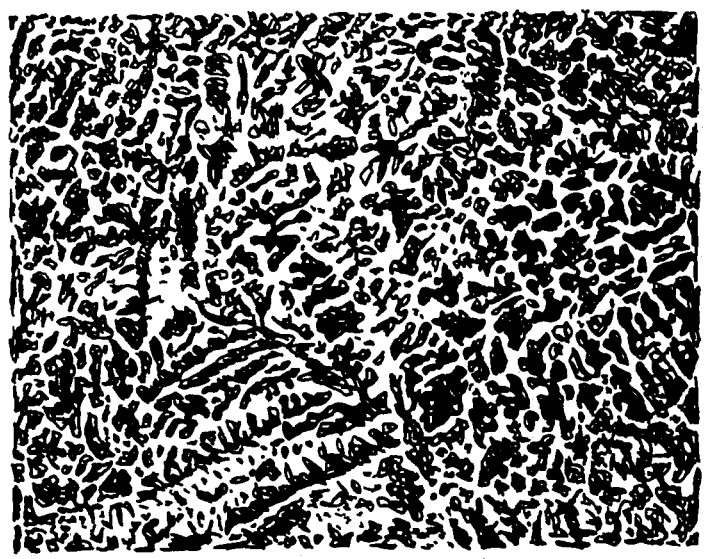
FIG. 8 is a scanning electron micrograph of an inventive active material of the first composition group before subjecting the material to an inventive process of preparation.
Figure 9:
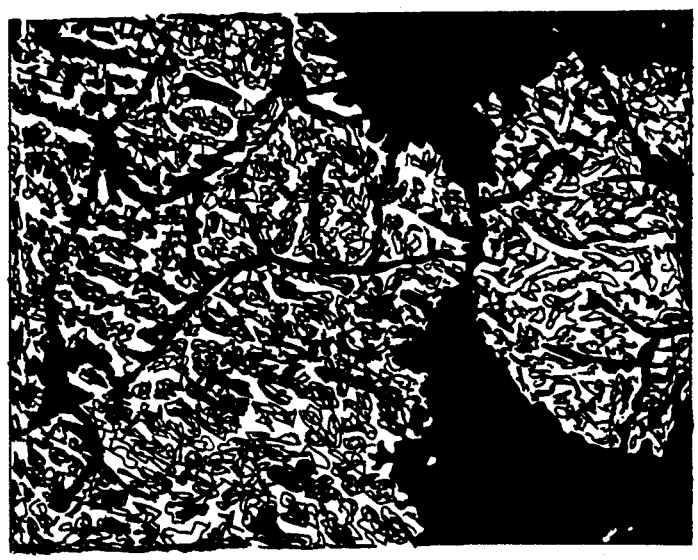
FIG. 9 is a scanning electron micrograph of the inventive material in FIG. 8 after subjecting the material to the inventive process of preparation.

Scanning electron micrographs were taken before hydriding in FIG. 8 and after hydriding in FIG. 9. These micrographs dramatically show cracking of the material around the various phase regions. Yet, the structure of the material remains unchanged.

The flakes were then pulverized using a ball-mill for three hours yielding the following distribution: greater than 38 micron size 25.4%; 30 to 38 micron size 12.5%; 5 to 30 micron size 60.4%; and 5 micron size or less 1.8%. Material which was greater than 38 micron size were subsequently reduced by longer ball-milling.

The 38 micron size particles then mixed with a nickel binder and pressed on to a conductive substrate of pure nickel mesh. The material filled mesh was then used as a hydrogen storage anode in a half-cell. This material showed an excellent electrochemical performance, equivalent to the material that had been air-hammered.

EXAMPLE 5

An active material composition of the formula $V_{53}Ti_{17}Cr_{16}Ni_{14}$ was prepared in accordance with the procedure listed in Example 3. The active material was then hydrided as in Example 4 and reduced to size of about −200 mesh. A nickel binder was added to the active material in an amount of about 7 atomic percent. After pressing, the active material was sintered at 1050° C. for five minutes in an hydrogen/argon atmosphere.

A standard sub C size cell was fabricated with a Pellon separator using a 1.8 Ahr. positive electrode produced by Eagle-Picher. A 30% KOH electrolyte was added and the cell was cycled by charging at 300 mA. for 8 hours. The initial capacity of the cell was approximately 1.7 Ahr. with a 1.0 volt cutoff. The capacity has maintained itself at approximately 1.7 Ahr. even after 170 cycles. Absolutely no degradation in the capacity has been observed. FIG. 10 illustrates the cycling region for this electrode demonstrating its long cycle life with a sustained capacity.

The present invention demonstrates a new and improved electrode, cell, and battery fabricated with novel active materials. The cells demonstrate bulk hydrogen storage with commercially acceptable charge and discharge rates, deep discharge capability, and long cycle life. The mechanical integrity of electrodes made with the inventive materials promotes long cycle life for the cells without substantial structural change or poisoning. The improved electrochemical performance and structural stability of the inventive electrodes is further benefited by economical fabrication. The ease and simplicity of their fabrication is demonstrated by the embrittlement process.

Modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. An active material for an hydrogen storage electrode, said material comprising the composition formula selected from the group consisting of:

$$(TiV_{2-x}Ni_x)_{1-y}M_y \quad (a)$$

whereas, $0.2 \leq x \leq 1.0$, $0 \leq y \leq 0.2$ and M=Al or Zr;

$$Ti_{2-x}Zr_xV_{4-y}Ni_y \quad (b)$$

whereas, $0 < x \leq 1.5$, $0.6 \leq y \leq 3.5$; and $$Ti_{1-x}Cr_xV_{2-y}Ni_y \quad (c)$$

whereas, $0 < x \leq 0.75$, $0.2 \leq y \leq 1.0$.

2. A material as defined in claim 1, wherein said composition is $$(TiV_{2-x}Ni_x)_{1-y}M_y,$$

whereas, $0.2 \leq x \leq 1.0$, $0 \leq y \leq 0.2$ and M=Al or Zr;

3. An active material as defined in claim 2, wherein said composition formula is $TiV_{2-x}Ni_x$ and $0.40 \leq x \leq 0.45$.

4. A material as defined in claim 1, wherein said composition formula is $$Ti_{2-x}Zr_xV_{4-y}Ni_y,$$

whereas, $0 < x \leq 1.5$, $0.6 \leq y \leq 3.5$.

5. A material as defined in claim 1, wherein said composition formula is $Ti_{2-x}Zr_xV_{4-y}Ni_y$, $0.95 \leq x \leq 1.05$ and y=2 or 3.

6. A material as defined in claim 1, wherein said composition formula is $$Ti_{1-x}Cr_xV_{2-y}Ni_y,$$

whereas, $0 < x \leq 0.75$, $0.2 \leq y \leq 1.0$.

7. A material as defined in claim 1, wherein said composition formula is $Ti_{1-x}Cr_xV_{2-y}$, $0.45 \leq x \leq 0.55$ and $0.4 \leq y \leq 0.6$.

8. A material as defined in claim 1, wherein said composition formula further includes hydrogen.

9. An active material for an hydrogen storage electrode, said material comprising:
titanium being present in an amount greater than about 28 and less than about 36 atomic percent;
vanadium being present in an amount greater than about 40 and less than about 56 atomic percent; and
nickel being present in an amount greater than about 10 and less than about 22 atomic percent.

10. A material as defined in claim 9, wherein said material further comprises at least one element selected from the group of aluminum and zirconium.

11. A material as defined in claim 10, wherein said selected element being present in an amount less than about 10 atomic percent.

12. A material as defined in claim 9, wherein:
said titanium is present in an amount of about 33 atomic percent;
said vanadium is present in an amount of about 53 atomic percent; and
said nickel is present in an amount of about 14 atomic percent.

13. A material as defined in claim 9, wherein said material further includes a binder.

14. A material as defined in claim 13, wherein said binder is nickel present in an amount of about 7 atomic percent.

15. A material as defined in claim 9, wherein said material further includes hydrogen.

16. A material as defined in claim 9, wherein said material further comprises at least one phase having a structure selected from the group consisting of amorphous, microcrystalline, polycrystalline, and any combination of these structures.

17. A material as defined in claim 9, wherein said material has a multiphase polycrystalline structure.

18. A material as defined in claim 17, wherein said structure includes:
a grain phase having a solid solution of said titanium and said vanadium with said nickel dissolved therein; and
a primary intergranular phase having an intermetallic compound of said titanium and said nickel with said vanadium dissolved therein, said intergranular phase in operative contact with said grain phase.

19. A material as defined in claim 18, wherein said grain phase includes said titanium and said vanadium being present in an amount of between 20:80 to 30:70 as a ratio of titanium:vanadium in atomic percent, and said nickel being present in an amount between about 4 to 8 atomic percent.

20. A material as defined in claim 18, wherein said primary intergranular phase includes said titanium and said nickel being present in approximately equal amounts, and said dissolved vanadium being present in an amount between about 6 to 8 atomic percent.

21. A material as defined in claim 18, wherein said structure further includes a grain boundary phase having a solid solution of said titanium and said vanadium with said nickel dissolved therein, said grain boundary phase in operative contact with said grain phase.

22. A material as defined in claim 21, wherein said grain boundary phase includes said titanium and said vanadium being present in an amount between about 45:55 to 55:45 as a ratio of titanium:vanadium and said dissolved nickel being present in an amount between about 10 to 14 atomic percent.

23. A material as defined in claim 18, wherein said structure further includes a secondary intergranular phase having an intermetallic compound of $Ti_2Ni$ with vanadium dissolved in said intermetallic compound in an amount between about 7 to 13 atomic percent.

24. A material as defined in claim 18, wherein said structure further includes a secondary intergranular phase having a vanadium rich side of the titanium and vanadium binary.

25. A material as defined in claim 18, wherein said grain phase has an average diameter between about 10 to 100 microns and said primary intergranular phase has an average width of between about 1 to 20 microns.

26. A material as defined in claim 18, wherein said grain phase is present in an amount of about 75 to 95 volume percent, the remaining volume of said material substantially including said intergranular phase.

27. An active material for an hydrogen storage electrode comprising:
titanium being present in an amount greater than about 15 and less than about 20 atomic percent;
vanadium being present in an amount greater than about 15 and less than about 40 atomic percent;
zirconium being present in an amount greater than about 10 and less than about 20 atomic percent; and
nickel being present in an amount greater than about 30 and less than about 55 atomic percent.

28. A material as defined in claim 27, wherein said material further includes a binder.

29. A material as defined in claim 27, wherein said binder is nickel present in an amount of about 7 atomic percent.

30. A material as defined in claim 27, wherein said material further includes hydrogen.

31. A material as defined in claim 27, wherein said material further comprises at least one phase having a structure selected from the group consisting of amorphous, microcrystalline, polycrystalline, and any combination of these structures.

32. A material as defined in claim 27, wherein said material has a multiphase polycrystalline structure.

33. A material as defined in claim 27, wherein said structure includes:
a grain phase having an intermetallic compound of said vanadium, said titanium, said zirconium, and said nickel; and
a primary intergranular phase having a solid solution of said titanium, said vanadium, and said zirconium with said nickel dissolved therein, said primary intergranular phase in operative contact with said grain phase.

34. A material as defined in claim 33, wherein said grain phase includes said vanadium, said titanium, said zirconium, and said nickel, being present in an amount of about 26:16:22:36 as a ratio of vanadium:titanium:zirconium:nickel in atomic percent.

35. A material as defined in claim 33, wherein said primary intergranular phase includes said titanium, said zirconium, and said nickel being present in an amount of about 25:20:46 as a ratio of titanium:zirconium:nickel in atomic percent, and said dissolved vanadium being present in an amount of about 9 atomic percent.

36. A material as defined in claim 33, wherein said structure further includes a grain boundary phase having a non-equilibrium phase incorporating said titanium, said vanadium, said zirconium, and said nickel, said grain boundary phase in operative contact with said grain phase.

37. A material as defined in claim 36, wherein said grain boundary phase includes said titanium, said vanadium, said zirconium, and said nickel being present in an amount of about 19:20:22:39 as a ratio of titanium:vanadium:zirconium:nickel in atomic percent.

38. A material as defined in claim 33, wherein said grain phase has an average diameter between about 10 to 100 microns and said primary intergranular phase has an average width of between about 1 to 20 microns.

39. A material as defined in claim 33, wherein said grain phase is present in an amount of about 75 to 95 volume percent, the remaining volume of said material substantially including said primary intergranular phase.

40. An active material for an hydrogen storage electrode, said material comprising:
titanium being present in an amount greater than about 5 and less than about 25 atomic percent;
vanadium being present in an amount greater than about 40 and less than about 55 atomic percent;
chromium being present in an amount greater than about 5 and less than about 25 atomic percent; and
nickel being present in an amount greater than about 10 and less than about 25 atomic percent.

41. A material as defined in claim 40, wherein said material further includes a binder.

42. A material as defined in claim 40, wherein said binder is nickel present in an amount of about 7 atomic percent.

43. A material as defined in claim 40, wherein said material further includes hydrogen.

44. A material as defined in claim 40, wherein said material further comprises at least one phase having a structure selected from the group consisting of amorphous, microcrystalline, polycrystalline, and any combination of these structures.

45. A material as defined in claim 40, wherein said material has a multiphase polycrystalline structure.

46. A material as defined in claim 45, wherein said structure includes:
a grain phase having a solid solution of said titanium, said vanadium, and said chromium with said nickel dissolved therein; and
a primary intergranular phase having an intermetallic compound of said titanium, said vanadium, and said nickel with said chromium dissolved therein, said primary intergranular phase in operative contact with said grain phase.

47. A material as defined in claim 46, wherein said grain phase includes said titanium present in an amount between about 3 to 10 atomic percent, said vanadium present in an amount between about 60 to 70 atomic percent, said chromium present in an amount between about 20 to 30 atomic percent, and said nickel being present in an amount between about 3 to 10 atomic percent.

48. A material as defined in claim 46, wherein said intergranular phase includes said titanium present in an amount of 20 to 50 atomic percent, said vanadium present in an amount between about 5 to 20 atomic percent, said nickel present in an amount between about 40 to 50 atomic percent, and said dissolved chromium being present in an amount between about 1 to 5 atomic percent.

49. A material as defined in claim 46, wherein said structure further includes a grain boundary phase having a solid solution of said titanium and said vanadium with said chromium and said nickel dissolved therein.

50. A material as defined in claim 40, wherein said grain phase has an average diameter between about 10 to 100 microns and said primary intergranular phase has an average width of between about 1 to 20 microns.

51. A material as defined in claim 40, wherein said grain phase is present in an amount of about 75 to 95 volume percent, the remaining volume of said material substantially including said intergranular phase.

52. An active material for a hydrogen storage electrode comprising a metallic alloy containing the elements titanium, vanadium, zirconium, and nickel in effective amounts for reversibly storing hydrogen; said material exhibiting a characteristic x-ray diffraction spectrum at the following d-spacings expressed in angstroms: 2.30-2.07 and 1.40-1.24.

53. A hydrogen storage electrode for use in an electrochemical cell, said electrode comprising a material selected from the group consisting of:

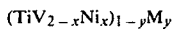  (a)

where, $0.2 \geq x \geq 1.0$, $0 \geq y \geq 0.2$ and M=Al or Zr;

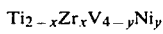  (b)

whereas, $0 > x \geq 1.5$, $0.6 > y \geq 3.5$; and

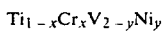  (c)

whereas, $0 > x \geq 0.75$, $0.2 \geq y \geq 1.0$.

54. An electrode as defined in claim 53, wherein said electrode further comprises collector means for collecting electrons from said material, said collector means positioned in electrical contact with said material.

55. An electrochemical cell comprising:
at least one electrode means for storing energy, said electrode means including a material selected from the group consisting of:

  (a)

wherein, $0.2 \geq x \geq 1.0$, $0 \geq y \geq 0.2$ and M=Al or Zr;

  (b)

whereas, $0 > x \geq 1.5$, $0.6 \geq y \geq 3.5$; and

  (c)

whereas, $0 > x \geq 0.75$, $0.2 \geq y \geq 1.0$;

at least one counter electrode means providing for the release of the energy stored in said electrode means, said counter electrode means positioned in said cell and spaced in operative contact with said electrode means; and a casing having said electrode means and said counter electrode means position therein.

56. A cell as defined in claim 55, wherein said electrode means is rechargeable.

57. A battery comprising a plurality of cells as defined in claim 55.

58. A cell as defined in claim 55, wherein said electrode means include at least one substantially flat sheet of said material, an electrically conductive tab in electrical contact with each of said sheets, said counter electrode means include at least one substantially flat counter electrode sheet; an electrically conductive tab in electrical contact with each of said counter electrode sheets; and, a substantially flat separator physically disposed between said electrode means and said counter electrode means.

59. A cell as defined in claim 55, wherein said electrode means and counter electrode means are spirally wound about an axis in a jelly-roll configuration.

* * * * *

UNITED STATES PATENT AND TRADEMARK OFFICE
CERTIFICATE OF CORRECTION

PATENT NO. : 4,551,400

DATED : November 5, 1985

INVENTOR(S) : Krishna Sapru et al.

It is certified that error appears in the above-identified patent and that said Letters Patent is hereby corrected as shown below:

In the Abstract, line 3, delete "elecro-" and insert --electro- --.

Column 1, line 19, delete "hs" and insert --has--.

Column 3, line 4, delete "an" and insert --a--.

Column 3, line 21, delete " $0 < x; 23\ 0.75,\ 0.2 \leq y \leq 1.0$." and insert -- $0 < x \leq 0.75,\ 0.2 \leq y \leq 1.0$. --

Column 3, lines 63 and 64, delete "distribution. Subsequently" and insert --distribution, subsequently--.

Column 4, line 54, delete "incorporate" and insert --incorporates--.

Column 4, lines 59 and 60, delete "combination" and insert --combinations--.

Column 4, line 66, delete "hydrideforming" and insert --hydride-forming--.

Column 5, line 16, delete "aout" and insert --about--.

Column 6, line 9, delete "equilibrium".

Column 6, line 41, delete "an", second occurrence, and insert --a--.

Column 6, line 66, delete "a", second occurrence, and insert --an--.

UNITED STATES PATENT AND TRADEMARK OFFICE
CERTIFICATE OF CORRECTION

PATENT NO. : 4,551,400

DATED : November 5, 1985

INVENTOR(S) : Krishna Sapru et al.

It is certified that error appears in the above-identified patent and that said Letters Patent is hereby corrected as shown below:

Column 7, line 29, delete "an", second occurrence, and insert --a--.

Column 8, line 23, delete "presents" and insert --present--.

Column 9, line 7, delete "forms" and insert --form--.

Column 10, line 23, delete "one" and insert --100--.

Column 10, line 52, delete "an", first occurrence, and insert --a--.

Column 15, line 12, delete "an" and insert --a--.

Column 15, lines 21 and 22, delete "region" and insert --regimen--.

Claim 1, line 45, delete "an", second occurrence, and insert --a--.

Claim 7, line 17, delete "$Ti_{1-x}Cr_xV_{2-y}$," and insert --$Ti_{1-x}Cr_xV_{2-y}Ni_y$,--.

Claim 9, line 21, delete "an", second occurrence, and insert --a--.

Claim 27, line 36, delete "an", second occurrence, and insert --a--.

Claim 40, line 35, delete "an", second occurrence, and insert --a--.

UNITED STATES PATENT AND TRADEMARK OFFICE
CERTIFICATE OF CORRECTION

PATENT NO. : 4,551,400    Page 3 of 3

DATED : November 5, 1985

INVENTOR(S) : Krishna Sapru et al.

It is certified that error appears in the above-identified patent and that said Letters Patent is hereby corrected as shown below:

Claim 53, line 42, delete "$0.2 \geq x \geq 1.0, 0 \geq y \geq 0.2$" and insert --$0.2 \leq x \leq 1.0, 0 \leq y \leq 0.2$--;

line 46, delete $0 > x \geq 1.5, 0.6 > y \geq 3.5$" and insert --$0 < x \leq 1.5, 0.6 < y \leq 3.5$--;

Claim 53, line 2, delete "$0 > x \geq 0.75, 0.2 \geq y \geq 1.0$" and insert --$0 < x \leq 0.75, 0.2 \leq y \leq 1.0$--.

Claim 55, line 14, delete "$0.2 \geq x \geq 1.0, 0 \geq y \geq 0.2$" and insert --$0.2 \leq x \leq 1.0, 0 \leq y \leq 0.2$--;

line 18, delete $0 > x \geq 1.5, 0.6 \geq y \geq 3.5$" and insert --$0 < x \leq 1.5, 0.6 \leq y \leq 3.5$--;

line 22, delete "$0 > x \geq 0.75, 0.2 \geq y \geq 1.0$" and insert --$0 < x \leq 0.75, 0.2 \leq y \leq 1.0$--;

line 29, delete "position" and insert --positioned--.

Signed and Sealed this

Twenty-second Day of July 1986

[SEAL]

*Attest:*

DONALD J. QUIGG

*Attesting Officer*    *Commissioner of Patents and Trademarks*